US011787929B2

(12) United States Patent
Zhou et al.

(10) Patent No.: US 11,787,929 B2
(45) Date of Patent: *Oct. 17, 2023

(54) COMPOSITIONS AND FILMS COMPRISING POLYLACTIC ACID POLYMER, POLYVINYL ACETATE POLYMER AND PLASTICIZER

(71) Applicant: 3M INNOVATIVE PROPERTIES COMPANY, St. Paul, MN (US)

(72) Inventors: Ning Zhou, Vadnais Heights, MN (US); Robert S. Clough, St. Paul, MN (US); Derek J. Dehn, Maplewood, MN (US); Jeffrey P. Kalish, St. Paul, MN (US); William W. Merrill, Mahtomedi, MN (US); Kevin M. Lewandowski, Inver Grove Heights, MN (US); Jayant Chakravarty, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,862

(22) Filed: Jan. 7, 2022

(65) Prior Publication Data

US 2022/0127444 A1 Apr. 28, 2022

Related U.S. Application Data

(63) Continuation of application No. 16/748,040, filed on Jan. 21, 2020, now Pat. No. 11,254,812, which is a
(Continued)

(51) Int. Cl.
*C08L 31/04* (2006.01)
*C08L 67/04* (2006.01)
(Continued)

(52) U.S. Cl.
CPC .............. *C08L 31/04* (2013.01); *B32B 7/12* (2013.01); *B32B 27/306* (2013.01); *C08J 5/18* (2013.01);
(Continued)

(58) Field of Classification Search
None
See application file for complete search history.

(56) References Cited

U.S. PATENT DOCUMENTS 3,011,988 A 12/1961 Luedke
4,950,258 A 8/1990 Kawai
(Continued)

FOREIGN PATENT DOCUMENTS

CN 101104779 1/2008
CN 101397394 4/2009
(Continued)

OTHER PUBLICATIONS 3M (TM) Screen printing UV Ink 9802 Opaque Black, 2016, pp. 02-03.
(Continued)

*Primary Examiner* — Vivian Chen
(74) *Attorney, Agent, or Firm* — Carolyn A. Fischer

(57) ABSTRACT

A composition is described comprising semicrystalline polylactic acid polymer; polyvinyl acetate polymer having a glass transition temperature (Tg) of at least 25° C.; plasticizer; and optionally amorphous polylactic acid polymer. In another embodiment the composition further comprises nucleating agent. Also described are films comprising the composition as well as articles, such as a tape or sheet, comprising the film described herein and a layer of pressure sensitive adhesive disposed on the film.

17 Claims, 4 Drawing Sheets

Related U.S. Application Data continuation of application No. 15/528,791, filed as application No. PCT/US2015/065557 on Dec. 14, 2015, now Pat. No. 10,577,494.

(60) Provisional application No. 62/095,285, filed on Dec. 22, 2014.

(51) Int. Cl.

| | |
|---|---|
| *C09J 7/25* | (2018.01) |
| *C08K 5/103* | (2006.01) |
| *C08K 5/11* | (2006.01) |
| *C09J 7/24* | (2018.01) |
| *B32B 7/12* | (2006.01) |
| *B32B 27/30* | (2006.01) |
| *C08J 5/18* | (2006.01) |
| *B32B 27/18* | (2006.01) |
| *B32B 7/04* | (2019.01) |
| *B32B 27/22* | (2006.01) |
| *B32B 27/08* | (2006.01) |
| *B32B 27/36* | (2006.01) |
| *C08K 5/09* | (2006.01) |
| *C09J 7/20* | (2018.01) |
| *C08K 5/10* | (2006.01) |
| *C08K 5/098* | (2006.01) |
| *C08K 3/01* | (2018.01) |
| *C08K 5/00* | (2006.01) |
| *C09J 133/26* | (2006.01) |

(52) U.S. Cl.
CPC .............. *C08K 5/103* (2013.01); *C08K 5/11* (2013.01); *C08L 67/04* (2013.01); *C09J 7/245* (2018.01); *C09J 7/255* (2018.01); *B32B 7/04* (2013.01); *B32B 27/08* (2013.01); *B32B 27/18* (2013.01); *B32B 27/22* (2013.01); *B32B 27/30* (2013.01); *B32B 27/36* (2013.01); *B32B 2250/02* (2013.01); *B32B 2307/30* (2013.01); *B32B 2307/50* (2013.01); *B32B 2307/54* (2013.01); *B32B 2307/702* (2013.01); *B32B 2307/704* (2013.01); *B32B 2333/00* (2013.01); *B32B 2367/00* (2013.01); *B32B 2405/00* (2013.01); *C08J 2331/04* (2013.01); *C08J 2367/04* (2013.01); *C08J 2431/04* (2013.01); *C08J 2467/04* (2013.01); *C08K 3/01* (2018.01); *C08K 5/0016* (2013.01); *C08K 5/0083* (2013.01); *C08K 5/09* (2013.01); *C08K 5/098* (2013.01); *C08K 5/10* (2013.01); *C08L 2203/16* (2013.01); *C08L 2205/02* (2013.01); *C08L 2205/025* (2013.01); *C08L 2205/03* (2013.01); *C08L 2205/24* (2013.01); *C09J 7/20* (2018.01); *C09J 133/26* (2013.01); *C09J 2301/302* (2020.08); *C09J 2431/00* (2013.01); *C09J 2431/005* (2013.01); *C09J 2431/006* (2013.01); *C09J 2433/00* (2013.01); *C09J 2467/00* (2013.01); *C09J 2467/006* (2013.01); *Y10T 428/31786* (2015.04); *Y10T 428/31928* (2015.04)

(56) References Cited

U.S. PATENT DOCUMENTS

| | | | |
|---|---|---|---|
| 5,032,460 A | 7/1991 | Kantner | |
| 5,216,050 A | 6/1993 | Sinclair | |
| 5,296,277 A | 3/1994 | Wilson | |
| 5,443,780 A | 8/1995 | Matsumoto | |
| 5,489,474 A * | 2/1996 | Shinoda | C09J 7/25 428/355 R |
| 5,502,158 A | 3/1996 | Sinclair | |
| 5,536,807 A | 7/1996 | Gruber | |
| 5,623,010 A | 4/1997 | Groves | |
| 5,663,288 A | 9/1997 | Shinoda | |
| 5,677,376 A | 10/1997 | Groves | |
| 5,686,504 A | 11/1997 | Ang | |
| 5,698,279 A | 12/1997 | Vicik | |
| 5,726,220 A | 3/1998 | Tokushige | |
| 5,798,436 A | 8/1998 | Gruber | |
| 5,814,685 A | 9/1998 | Satake | |
| 5,883,199 A | 3/1999 | McCarthy | |
| 6,005,068 A | 12/1999 | Gruber | |
| 6,113,679 A | 9/2000 | Adkins | |
| 6,114,495 A | 9/2000 | Kolstad | |
| 6,121,410 A | 9/2000 | Gruber | |
| 6,136,905 A | 10/2000 | Suzuki | |
| 6,143,863 A | 11/2000 | Gruber | |
| 6,160,084 A | 12/2000 | Langer | |
| 6,232,359 B1 | 5/2001 | Christian | |
| 6,294,249 B1 | 9/2001 | Hamer | |
| 6,323,308 B1 | 11/2001 | Kobayashi | |
| 6,498,202 B1 | 12/2002 | Sun | |
| 6,534,172 B1 | 3/2003 | Kawashima | |
| 6,600,008 B1 | 7/2003 | Kobayashi | |
| 6,649,732 B2 | 11/2003 | Kobayashi | |
| 6,846,075 B2 | 1/2005 | Ylitalo | |
| 6,869,985 B2 | 3/2005 | Mohanty | |
| 6,881,458 B2 | 4/2005 | Ludwig | |
| 6,949,212 B2 | 9/2005 | Merrill | |
| 7,025,453 B2 | 4/2006 | Ylitalo | |
| 7,371,799 B2 | 5/2008 | Mather | |
| 7,385,020 B2 | 6/2008 | Anderson | |
| 8,158,731 B2 | 4/2012 | Stefanisin | |
| 8,178,190 B2 | 5/2012 | Savagian | |
| 8,512,852 B2 | 8/2013 | Shimizu | |
| 8,530,021 B2 | 9/2013 | Bartusiak | |
| 8,748,543 B2 | 6/2014 | Masuda | |
| 8,883,290 B2 | 11/2014 | Lowe | |
| 9,096,782 B2 | 8/2015 | Takahira | |
| 9,175,181 B2 | 11/2015 | Butler | |
| 9,574,082 B2 * | 2/2017 | Matsuoka | C08J 5/18 |
| 10,435,557 B2 * | 10/2019 | Orts | C08J 3/005 |
| 10,577,494 B2 | 3/2020 | Zhou | |
| 10,759,980 B1 | 9/2020 | Zhou | |
| 10,982,090 B2 | 4/2021 | Zhou | |
| 11,066,551 B2 * | 7/2021 | Merrill | B32B 27/365 |
| 11,254,812 B2 * | 2/2022 | Zhou | C09J 7/245 |
| 11,407,872 B2 * | 8/2022 | Fishman | A61F 11/08 |
| 2002/0094444 A1 | 7/2002 | Nakata | |
| 2003/0013821 A1 * | 1/2003 | Tan | B32B 27/10 525/413 |
| 2003/0021973 A1 | 1/2003 | Topolkaraev | |
| 2003/0215628 A1 | 11/2003 | Ma | |
| 2003/0216496 A1 | 11/2003 | Mohanty | |
| 2004/0005136 A1 | 1/2004 | Okumura | |
| 2004/0068059 A1 | 4/2004 | Katayama | |
| 2004/0093831 A1 * | 5/2004 | Busch | B65D 75/36 53/396 |
| 2004/0122174 A1 | 6/2004 | Mather | |
| 2004/0127650 A1 | 7/2004 | De Koning | |
| 2005/0112352 A1 | 5/2005 | Laney | |
| 2005/0175833 A1 | 8/2005 | Yoneda | |
| 2005/0182201 A1 * | 8/2005 | Matsumoto | C08J 5/18 525/418 |
| 2006/0100395 A1 | 5/2006 | Aritake | |
| 2006/0188706 A1 | 8/2006 | Kobayashi | |
| 2006/0257676 A1 | 11/2006 | Itada | |
| 2006/0269710 A1 | 11/2006 | Inglis | |
| 2007/0255013 A1 | 11/2007 | Becraft | |
| 2009/0018237 A1 | 1/2009 | Fujii | |
| 2009/0123728 A1 | 5/2009 | Cheung | |
| 2009/0148713 A1 | 6/2009 | Lee | |
| 2009/0148715 A1 | 6/2009 | Lee | |
| 2009/0152095 A1 | 6/2009 | Kawahara | |
| 2009/0162683 A1 | 6/2009 | Douard | |
| 2010/0013121 A1 | 1/2010 | Hashimoto | |
| 2010/0040904 A1 | 2/2010 | Cloutier | |
| 2010/0316845 A1 | 12/2010 | Rule | |
| 2010/0323196 A1 | 12/2010 | Dou | |

(56) References Cited

U.S. PATENT DOCUMENTS

| | | |
|---|---|---|
| 2010/0330382 A1 | 12/2010 | Dou |
| 2011/0086998 A1 | 4/2011 | Kusunoki |
| 2011/0091666 A1 | 4/2011 | Wang |
| 2011/0171489 A1 | 7/2011 | Dou |
| 2011/0196076 A1 | 8/2011 | Yoshino |
| 2011/0207858 A1 | 8/2011 | Pfaadt |
| 2011/0224342 A1 | 9/2011 | Masuda |
| 2011/0244185 A1 | 10/2011 | Dou |
| 2011/0244186 A1 | 10/2011 | Dou |
| 2011/0256338 A1 | 10/2011 | Ausen |
| 2011/0287237 A1 | 11/2011 | Riebel |
| 2012/0122745 A1 | 5/2012 | Mullen |
| 2012/0135169 A1 | 5/2012 | Tangelder |
| 2012/0149844 A1 | 6/2012 | Whitehouse |
| 2012/0211918 A1 | 8/2012 | Ausen |
| 2012/0270978 A1 | 10/2012 | Myers |
| 2012/0296015 A1 | 11/2012 | Van Heemst |
| 2012/0315454 A1 | 12/2012 | Wang |
| 2013/0075480 A1* | 3/2013 | Yokogi .................. C08L 69/00 235/487 |
| 2013/0156946 A1 | 6/2013 | Wada |
| 2013/0184386 A1 | 7/2013 | Coudyser |
| 2013/0236723 A1 | 9/2013 | Ishiguro |
| 2013/0273353 A1 | 10/2013 | Ting |
| 2013/0310288 A1 | 11/2013 | Mullen |
| 2013/0331493 A1 | 12/2013 | Yamamura |
| 2014/0087108 A1 | 3/2014 | Scalzo |
| 2014/0138025 A1 | 5/2014 | Bartusiak |
| 2014/0186563 A1 | 7/2014 | Hsu |
| 2014/0272357 A1 | 9/2014 | He |
| 2015/0037526 A1 | 2/2015 | Seth |
| 2015/0361231 A1 | 12/2015 | Li |
| 2016/0304751 A1 | 10/2016 | Mussig |
| 2017/0313912 A1 | 11/2017 | Zhou |
| 2018/0297342 A1 | 10/2018 | Pailler |
| 2019/0099991 A1 | 4/2019 | Zhou |
| 2019/0136045 A1 | 5/2019 | Merrill |
| 2019/0185662 A1 | 6/2019 | Zhou |
| 2019/0218423 A1 | 7/2019 | Bartusiak |
| 2019/0256677 A1 | 8/2019 | Fishman |
| 2019/0284351 A1 | 9/2019 | Yaguchi |
| 2019/0284357 A1 | 9/2019 | Merrill |
| 2021/0122890 A1 | 4/2021 | Dehn |
| 2022/0169846 A1* | 6/2022 | Zhou .................. C08J 5/128 |

FOREIGN PATENT DOCUMENTS

| | | |
|---|---|---|
| CN | 102099186 | 6/2011 |
| CN | 103265798 | 8/2013 |
| DE | 202006001693 | 3/2006 |
| EP | 0373646 | 6/1990 |
| EP | 0587069 | 3/1994 |
| JP | 4242109 | 8/1992 |
| JP | 09-151310 | 6/1997 |
| JP | 2000-289169 | 10/2000 |
| JP | 2004-010843 | 1/2004 |
| JP | 2005-053223 | 3/2005 |
| JP | 2005-143413 | 6/2005 |
| JP | 2006-035666 | 2/2006 |
| JP | 2006-045290 | 2/2006 |
| JP | 2006-124446 | 5/2006 |
| JP | 2007-216541 | 8/2007 |
| JP | 2007-217513 | 8/2007 |
| JP | 2009-107669 | 5/2009 |
| JP | 2011-006615 | 1/2011 |
| JP | 2011-136428 | 7/2011 |
| JP | 2012-192636 | 1/2012 |
| JP | 2013-001024 | 1/2013 |
| JP | 2013-147580 | 8/2013 |
| JP | 2014-001261 | 1/2014 |
| JP | 2015-120807 | 7/2015 |
| KR | 2014-0059778 | 5/2014 |
| WO | WO 1990-001521 | 2/1990 |
| WO | WO 1992-004413 | 3/1992 |
| WO | WO 1994-006856 | 3/1994 |
| WO | WO 1994-007949 | 4/1994 |
| WO | WO 1998-015601 | 4/1998 |
| WO | WO 1998-029516 | 7/1998 |
| WO | WO 1998-040434 | 9/1998 |
| WO | WO 1999-003907 | 1/1999 |
| WO | WO 2004-033539 | 4/2004 |
| WO | WO 2007-027163 | 3/2007 |
| WO | WO 2007-084291 | 7/2007 |
| WO | WO 2008-051443 | 5/2008 |
| WO | WO 2008-130225 | 10/2008 |
| WO | WO 2009-120311 | 10/2009 |
| WO | WO 2010-055903 | 5/2010 |
| WO | WO 2010-078134 | 7/2010 |
| WO | WO 2010-088067 | 8/2010 |
| WO | WO 2010-118041 | 10/2010 |
| WO | WO 2010/133560 A * | 11/2010 |
| WO | WO 2010-151558 | 12/2010 |
| WO | WO 2011-060001 | 5/2011 |
| WO | WO 2011-082052 | 7/2011 |
| WO | WO 2011-123682 | 10/2011 |
| WO | WO 2012-148421 | 11/2012 |
| WO | WO 2013-031755 | 3/2013 |
| WO | WO 2013-093781 | 6/2013 |
| WO | WO 2013-118023 | 8/2013 |
| WO | WO 2013-184822 | 12/2013 |
| WO | WO 2014-061243 | 4/2014 |
| WO | WO 2014-172185 | 10/2014 |
| WO | WO 2014-176509 | 10/2014 |
| WO | WO 2015-157350 | 10/2014 |
| WO | WO 2015-071447 | 5/2015 |
| WO | WO 2017-105887 | 6/2017 |
| WO | WO 2017-112386 | 6/2017 |
| WO | WO 2017-142730 | 8/2017 |
| WO | WO 2017-200756 | 11/2017 |
| WO | WO 2017-222824 | 12/2017 |
| WO | WO 2017-222863 | 12/2017 |

OTHER PUBLICATIONS 3M (TM) Screen printing ink 1905 Black, 2016, pp. 03.

Aldrich Data Sheet (Year: 2019).

Anderson, "Toughening Polylactide", Polymer reviews, 2008, vol. 48, pp. 85-108.

ASTM D882-10, "Standard Test Method for Tensile Properties of Thin Plastic Sheeting," downloaded Jan. 21, 2020, 10 pages Brüggemann, Oliver, "Polyvinylacetate," RÖMPP online, Dec. 31, 2009, XP 055591580, retrieved from the Internet: https//roempp.thieme.de/roempp4.0/data/RD-16-03642 [retrieved on May 24, 2019], 2 pages El-Hadi, "Effect of processing conditions on the development of morphological features of banded or nonbanded spherulites of poly(3-hydroxybutyrate) (PHB) and polylactic acid (PLLA) blends", Polymer engineering and science, 2011, pp. 2191-2202.

FG00099—Vutek® GSLXR 3M Superflex Ink, 2015, pp. 03.

Gajria, "Miscibility and Biodegradability of Blends of Poly (Lactic Acid) and Poly (Vinyl Acetate)," Polymer, Feb. 1996, vol. 37, No. 3, pp. 437-444.

Gottfried, "Principles of Aging", Resistance and Stability of Polymers, 2013, pp. 01-138.

Gotto, "PolyLactic Acid (PLA) is Gaining Traction in the market," Polymer Innovation Blog, retrieved on Sep. 15, 2020, Year: 2020, 9 pages.

Hansen, Vae Based Polymers For Biobased Products, Wacker Polymers, 2011, 24 pages.

Hong, "Miscibility and Physical Properties of Poly (Lactic Acid) (PLA) and Poly (Vinyl Acetate) (PVAc) Blends," Polymeric Materials: Science & Engineering, 2009, vol. 101, pp. 960-961.

HP Safety Data Sheet, C4940 Series, 9380 Version No. 02, 2015, 1 page.

Ikada, "Stereocomplex Formation Between Enantiomeric Poly(lactides)", Macromolecules, 1987, vol. 20, No. 04, pp. 904-906.

Jamshidian, "Poly-Lactic Acid: Production, Applications, Nanocomposites, and Release Studies," Comprehensive Reviews in Food Science and Food Safety, Sep. 2010, vol. 9, No. 5, pp. 552-571.

(56) References Cited

OTHER PUBLICATIONS

Kasai, Nucleating Agents for Inducing the Crystallization of PLA-Ecopromote, Innovation Takes Root Conference, Feb. 2012, 35 pages.
Krouse, "Stereocomplex Formation Between Enantiomeric Poly(lactides)", Macromolecules, 1987, vol. 20, No. 4, pp. 904-906.
Levamelt, Protection Energized by Lanxess, Product Brochure, 16 pages.
Lim, "Processing Technologies for Poly (Lactic Acid)," Progress in Polymer Science, Aug. 2008, vol. 33, No. 8, pp. 820-852.
Material Safety Data Sheet, The Hallstar Company, 3 pages.
Mulligan, "Nonlinear mechanooptical behaviour of uniaxially stretched poly(lactic acid): Dynamic phase behaviour", Macromolecules, 2005, vol. 38, pp. 2333-2344.
Natureworks LLC, Ingeo Biopolymer 2003D Technical Data Sheet For Fresh Food Packaging and Food Serviceware, 3 pages.
Natureworks LLC, Ingeo Biopolymer 4032D Technical Data Sheet, Biaxially Oriented Films—High Heat, 3 pages.
Natureworks LLC, Ingeo Resin Product Guide, 2 pages.
Randall, Enhancing Performance of Biopolymers Through Polymer and Formulation Design, NatureWorks LLC, Bioplastics Compounding and Processing, May 2012, 39 pages.
Roland Data Sheet, "ECO-SOL MAX2, ESL4-CY, ECO-SOL MAX2, ESL4-4CY, v. G_5.0", Dec. 21, 2015, 1 page.
Roland, "ECO-SOL MAX2, ESL4-CY and ECO-SOL MAX2,ESL4-4CY", 2015, 1page.
Shin, "Miscibility of biodegradable aliphatic polyester and poly(vinyl acetate) blends", J. Appl. Polym Sci, 2000, vol. 77, pp. 1348-1352.
Sivalingam, "Enzymatic degradation of poly($\epsilon$-caprolactone) and poly(vinyl acetate) and their blends by lipases," Chemical Engineering Science, 2003, vol. 58, pp. 2911- 2919.
Sivalingam, "Blends of poly($\epsilon$-caprolactone) and poly(vinyl acetate): mechanical properties and thermal degradation, Polymer degradation and stability", 2004, vol. 84, pp. 345-351.
Suryanegara, "The Synergetic Effect of Phenylphosphonic Acid Zinc and Microfibrillate Cellulose on the Injection Molding Cycle Time of PLA Composites," Cellulose, Jun. 2011, vol. 18, No. 3, pp. 689-698.
Synbra, Datasheet: Good flow: Compounding, Synterra® PDLA 1010, Version: Jul. 2012, 1 page.
Synbra, Datasheet: High Molecular Weight for Extrusion, Synterra® 78PDLA 1510, Version: Jul. 2012, 1 page.
Trejo, "Fungal degradation of polyvinyl acetate", Ecotoxicology and environmental safety, 1988, vol. 16, pp. 25-35.
Tsai, "Crystallinity and dimensional stability of biaxial oriented poly(lactic acid) films", Polymer degradation and stability, 2010, vol. 95, pp. 1292-1298.
Tsuji, "Isothermal and Non-Isothermal Crystallization Behavior of Poly(L-Lactic Acid): Effects of Stereocomplex as Nucleating Agent", Polymer, 2006, vol. 47, Issue 15, pp. 5430.
Tsuji, "Water vapor permeability of poly(lactide)s: Effects of molecular characteristics and crystallinity", Journal of applied polymer science, 2006, vol. 99, pp. 2245-2252.
"Vertellus-Citorflex A-4 Plasticizer" (https://www.vertellus.com/products/plastics-polymers/citroflex-plasticizers/citroflex-a-4-plasticizer-acetyl-tributyl-citrate) (webpage retrieved Apr. 27, 2019) (Year: 2019).
Vertellus, Citroflex® A-4 Technical Data Sheet, Vertellus Specialties Inc. 2006, 2 pages.
Vinnapas, Technical data sheet, 2010, 2 pages.
"Wacker Polymers—VINNAPAS (5279e)" (Jun. 2006) (Year: 2006).
"Wacker Polymers—VINNAPAS (6766E)" (May 2011) (Year: 2011).
"Wacker Polymers—VINNEX (7002E)" (Aug. 2013) (Year: 2013).
"Wikipedia—Polylactic Acid" (https://en.wikipedia.org/wiki/Polyactic_acid) (webpage retrieved Dec. 8, 2018) (Year: 2018).
Wacker Biosolutions, Technical Data Sheet for Vinnex 2510, 2 pages.
Wacker Polymers, Technical Data Sheet for Vinnapas UW 4 FS, 2 pages.
Wacker, Bioplastics—Co-Binders For Biopolymers, Vinnex—Enabling The Next Generation of Bioplastics, 24 pages.
International Search Report for PCT International Application No. PCT/US2017/031043, dated Aug. 17, 2017, 5 pages.
International Search Report for PCT International Application No. PCT/US2017/016699, dated Jul. 11, 2017, 5 pages.
International Search Report for PCT International Application No. PCT/US2015/065557, dated Mar. 14, 2016, 5 pages.
International Search report for PCT International Application No. PCT/US2016/064897 dated Mar. 17, 2017, 6 pages.
International Search report for PCT International Application No. PCT/US2017/036686 dated Sep. 11, 2017, 4 pages. (78437W0003)

* cited by examiner

COMPOSITIONS AND FILMS COMPRISING POLYLACTIC ACID POLYMER, POLYVINYL ACETATE POLYMER AND PLASTICIZER

CROSS REFERENCE TO RELATED APPLICATIONS

This application is a continuation of U.S. application Ser. No. 16/748,040, filed Jan. 21, 2020, now U.S. Pat. No. 11,254,812, which is a continuation of U.S. application Ser. No. 15/528,791, filed May 23, 2017, now U.S. Pat. No. 10,577,494, which is a national stage filing under 35 U.S.C. 371 of PCT/US2015/065557, filed Dec. 14, 2015, which claims the benefit of U.S. Provisional Application No. 62/095285, filed Dec. 22, 2014, the disclosure of which is incorporated by reference in its/their entirety herein.

SUMMARY

In one embodiment a composition is described comprising semicrystalline polylactic acid polymer; polyvinyl acetate polymer having a glass transition temperature (Tg) of at least 25° C.; plasticizer; and optionally amorphous polylactic acid polymer.

In another embodiment a composition is described comprising semicrystalline polylactic acid polymer; polyvinyl acetate polymer having a Tg of at least 25° C.; plasticizer; nucleating agent; and optionally amorphous polylactic acid polymer.

In some embodiments, the polyvinyl acetate polymer is present in an amount of at least 15 or 20 wt.-% based on the total amount of polylactic acid polymer(s), polyvinyl acetate polymer and plasticizer. In some embodiments, the plasticizer is present in an amount ranging from 5 or 35 wt.-%, based on the total amount of polylactic acid polymer(s), polyvinyl acetate polymer and plasticizer. In some embodiments, the semicrystalline polylactic acid polymer comprises at least 90 wt.-% of polymerized units of L-lactide and less than 10, 9, 8, 7, 6, 5, 4, 3, or 2 wt.-% of D-lactide and/or meso-lactide. In favored embodiments, the composition has a net melting endotherm for the second heating scan, $\Delta H_{nm2}$, greater than 10, 11, 12, 13, 14, or 15 and less than 40 J/g. Further, the composition preferably has a Tg less than 30° C., 25° C. or 20° C.

In another embodiment, a film is described comprising such composition(s). The film preferably has a net melting endotherm for the first heating scan, $\Delta H_{nm1}$, greater than 10, 11, 12, 13, 14, or 15 and less than 40 J/g. Further, the film preferably has a Tg less than 30° C., 25° C. or 20° C.

In another embodiment, an article is described such as a tape or sheet, comprising the film described herein and a layer of pressure sensitive adhesive disposed on the film.

DETAILED DESCRIPTION

Figure 1:
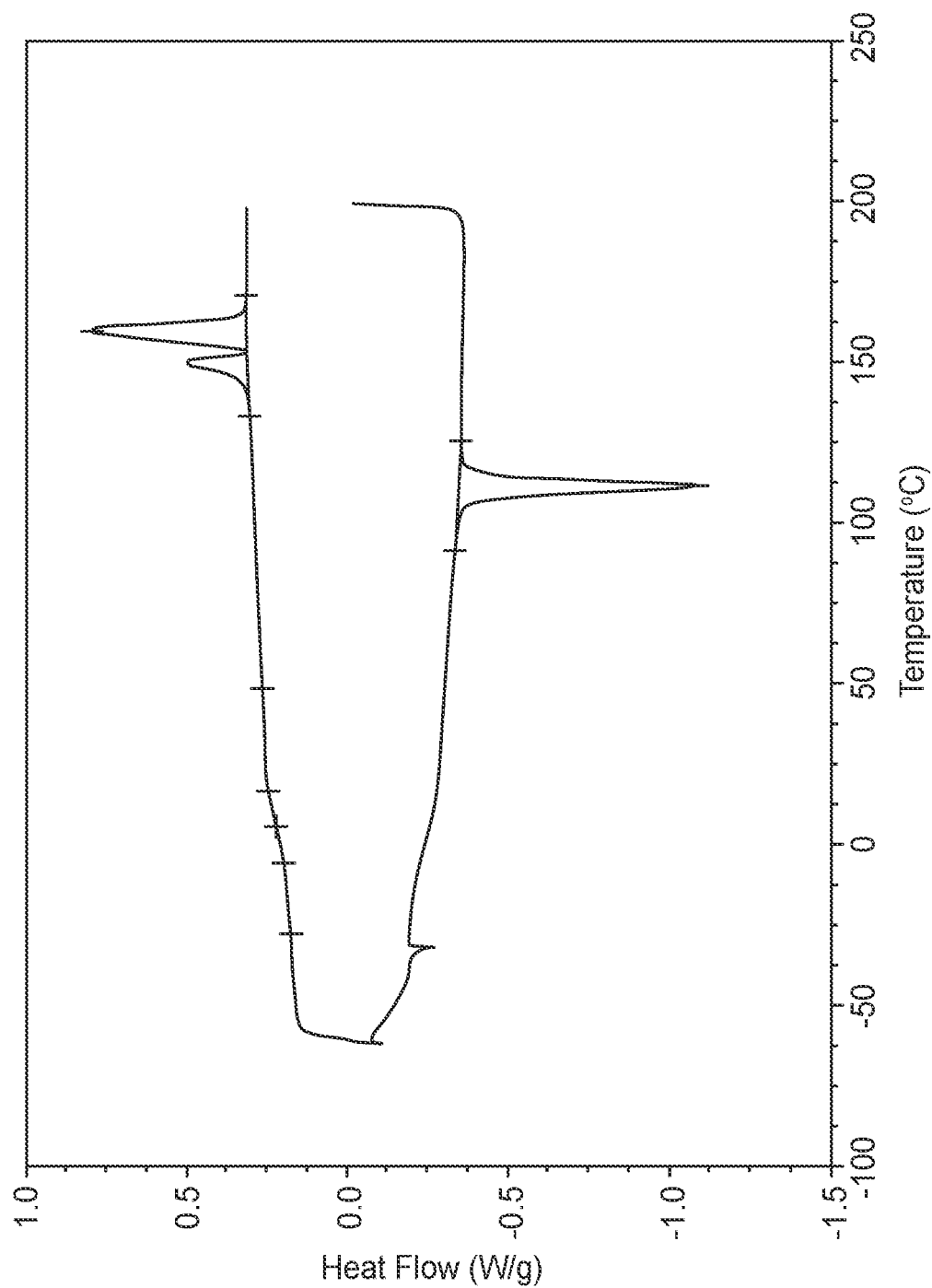
FIG. 1 is a representative DSC profile of a composition comprising a nucleating agent exhibiting a sharp crystallization peak exotherm during cooling.

The compositions described herein comprise polylactic acid ("PLA") polymer. Lactic acid is a renewable material obtained by the bacterial fermentation of corn starch or cane sugar, and thus is considered a natural or in other words "biomass" material. Lactic acid has two optical isomers: L-lactic acid (also known as (S)-lactic acid) and D-lactic acid (also known as (R)-lactic acid), depicted as follows:

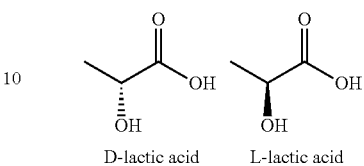

D-lactic acid    L-lactic acid

Polyesterification of lactic acid affords polylactic acid polymer.

More typically, lactic acid is typically converted to the cyclic lactide monomer, and the lactide undergoes ring opening polymerization, such as depicted as follows:

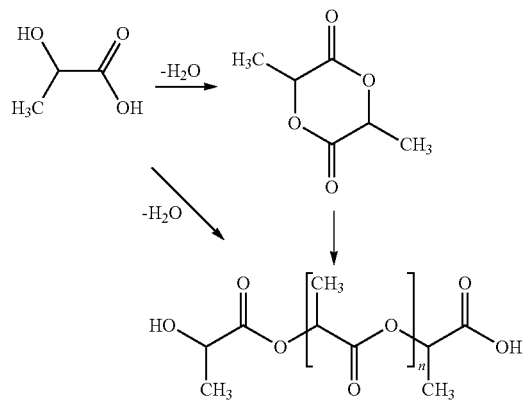

The resulting polymer material is typically referred to as polylactide polymer.

The degree of crystallinity, and hence many important properties, is largely controlled by the ratio of D and/or meso-lactide to L cyclic lactide monomer used. Likewise, for polymers prepared by direct polyesterification of lactic acid, the degree of crystallinity is largely controlled by the ratio of polymerized units derived from D-lactic acid to polymerized units derived from L-lactic acid.

The compositions and films described herein generally comprise a semicrystalline PLA polymer alone or in combination with an amorphous PLA polymer. Both the semicrystalline and amorphous PLA polymers generally comprise high concentrations of polymerized units derived from L-lactic acid (e.g. L-lactide) with low concentrations of polymerized units derived from D-lactic acid (e.g. D-lactide).

The semicrystalline PLA polymer typically comprises typically comprises at least 90, 91, 92, 93, 94, or 95 wt.-% of polymerized units derived from L-lactic acid (e.g. L-lactide) and no greater than 10, 9, 8, 7, 6, or 5 wt.-% of polymerized units derived from D-lactic acid (e.g. D-lactide and/or meso-lactide). In yet other embodiments, the semicrystalline PLA polymer comprises at least 96 wt.-% of polymerized units derived from L-lactic acid (e.g. L-lactide) and less than 4, 3, or 2 wt.-% of polymerized units derived from D-lactic acid (e.g. D-lactide and/or meso-lactide. Likewise the composition and film comprises an even lower concentration of polymerized units derived from D-lactic acid (e.g. D-lactide and/or meso-lactide) depending on the concentration of semicrystalline PLA polymer in the composition or film. For example, if the composition comprises 15 wt.-% of a semicrystalline PLA having about 2 wt.-% D-lactide and/or meso-lactide, the composition comprises about 0.3 wt.-% D-lactide and/or meso-lactide. The composition and film generally comprises no greater than 9, 8, 7, 6, 5, 4, 3, 2, 1.5, 1.0, 0.5, 0.4, 0.3, 0.2, or 0.1 wt.-% polymerized units derived from D-lactic acid (e.g. D-lactide and/or meso-lactide). Suitable examples of semicrystalline PLA include Natureworks™ Ingeo™ 4042D and 4032D. These polymers have been described in the literature as having molecular weight Mw of about 200,000 g/mole; Mn of about 100,000 g/mole; and a polydispersity of about 2.0.

The composition may further comprise an amorphous PLA polymer blended with the semicrystalline PLA. The amorphous PLA typically comprises no more than 90 wt.-% of polymerized units derived from L-lactic acid and greater than 10 wt.-% of polymerized units derived from D lactic acid (e.g. D-lactic lactide and/or meso-lactide). In some embodiments, the amorphous PLA comprises at least 80 or 85 wt.-% of polymerized units derived from L-lactic acid (e.g. L-lactide). In some embodiments, the amorphous PLA comprises no greater than 20 or 15 wt.-%. of polymerized units derived from D-lactic acid (e.g. D-lactide and/or meso-lactide). A suitable amorphous PLA includes Natureworks™ Ingeo™ 4060D grade. This polymer has been described in the literature to have a molecular weight Mw of about 180,000 g/mole.

The PLA polymers are preferably "film grade" polymers, having a melt flow rate (as measured according to ASTM D1238) of no greater than 25, 20, 15, or 10 g/min at 210° C. with a mass of 2.16 kg. In some embodiments, the PLA polymer has a melt flow rate of less than 10 or 9 g/min at 210° C. The melt flow rate is related to the molecular weight of the PLA polymer. The PLA polymer typically has a weight average molecular weight (Mw) as determined by Gel Permeation Chromatography with polystyrene standards of at least 50,000 g/mol; 75,000 g/mol; 100,000 g/mol; 125,000 g/mol; 150,000 g/mol. In some embodiments, the molecular weight (Mw) is no greater than 400,000 g/mol; 350,000 g/mol or 300,000 g/mol.

The PLA polymers typically have a tensile strength ranging from about 25 to 150 MPa; a tensile modulus ranging from about 1000 to 7500 MPa; and a tensile elongation of at least 3, 4, or 5 ranging up to about 15%. In some embodiments, the tensile strength of the PLA polymer is at least 30, 40 or 50 MPa. In some embodiments, the tensile strength of the PLA polymer is no greater than 125, 100 or 75 MPa. In some embodiments, the tensile modulus of the PLA polymer is at least 1500, 2000, or 2500 MPa. In some embodiments, the tensile modulus of the PLA polymer is no greater than 7000, 6500, 6000, 5500, 5000, or 4000 MPa. Such tensile and elongation properties can be determined by ASTM D882 and are typically reported by the manufacturer or supplier of such PLA polymers.

The PLA polymers generally have a glass transition temperature, Tg, as can be determined by Differential Scanning Calorimetry (DSC) as described in the forthcoming examples, ranging from about 50 to 65° C.

The semicrystalline PLA polymers typically have a melting point ranging from 140 to 175° C. The PLA polymer, typically comprising a semicrystalline PLA alone or in combination with an amorphous PLA polymer can be melt-processed at temperatures of 180, 190, 200, 210, 220 or 230° C.

The composition typically comprises a semicrystalline PLA polymer or a blend of semicrystalline and amorphous PLA in an amount of at least 40, 45 or 50 wt.-%, based on the total weight of the PLA polymer, polyvinyl acetate polymer, and plasticizer. The total amount of PLA polymer is typically no greater than 90, 85, 80, 75, or 70 wt.-% of the total weight of the PLA polymer, polyvinyl acetate polymer, and plasticizer When the composition comprises a blend of semicrystalline and amorphous PLA, the amount of semicrystalline PLA is typically at least 10, 15 or 20 wt.-%, based on the total weight of the PLA polymer, polyvinyl acetate polymer, and plasticizer. In some embodiments, the amount of amorphous PLA polymer ranges from 10, 15, 25 or 30 wt.-% up to 50, 55 or 60 wt.-% based on the total weight of the PLA polymer, polyvinyl acetate polymer, and plasticizer. The amount of amorphous PLA polymer can be greater than the amount of crystalline polymer.

The composition further comprises a polyvinyl acetate polymer. The polyvinyl acetate polymer has a Tg of at least 25, 30, 35 or 40° C. The Tg of the polyvinyl acetate is typically no greater than 50 or 45° C.

The polyvinyl acetate polymer typically has a weight or number average molecular weight (as determined by Size Exclusion Chromatography with polystyrene standards) of at least 50,000 g/mol; 75,000 g/mol; 100,000 g/mol; 125,000 g/mol; 150,000 g/mol; 175,000 g/mol; 200,000 g/mol; 225,000 g/mol or 250,000 g/mol. In some embodiments, the molecular weight (Mw) is no greater than 1,000,000 g/mol; 750,000 g/mol; 500,000 g/mol; 450,000 g/mol; 400,000 g/mol; 350,000 g/mol or 300,000 g/mol. In some embodiments, the molecular weight of the polyvinyl acetate polymer is greater than the molecular weight of the PLA polymer(s). The polyvinyl acetate polymer may be characterized as having a viscosity in a 10 wt.% ethyl acetate solution at 20° C. ranging from 10 to 50 mPa*s.

The polyvinyl acetate polymer is typically a homopolymer. However, the polymer may comprise relatively low concentrations of repeat units derived from other comonomers, provided that the Tg of the polyvinyl acetate polymer is within the ranges previously described. Other comonomers include for example acrylic monomers such as acrylic acid and methyl acrylate; vinyl monomers such as vinyl chloride and vinyl pyrollidone; and $C_2$-$C_8$ alkylene monomers, such as ethylene. The total concentration of repeats derived from other comonomers of the polyvinyl acetate polymer is typically no greater than 10, 9, 8, 7, 6, or 5 wt.-%. In some embodiments, the concentration of repeats derived from other comonomers of the polyvinyl acetate polymer is typically no greater than 4, 3, 2, 1 or 0.5 wt.-%. The polyvinyl acetate polymer typically has a low level of hydrolysis. The polymerized units of the polyvinyl acetate polymer that are hydrolyzed to units of vinyl alcohol is generally no greater than 10, 9, 8, 7, 6, 5, 4, 3, 2, 1 or 0.5 mol % of the polyvinyl acetate polymer.

Polyvinyl acetate polymers are commercially available from various suppliers including Wacker under the trade designation VINNAPAS™. Prior to combining with the PLA, such polyvinyl acetate polymers are often in a (e.g. white) solid powder or colorless bead form. In some embodiments, the polyvinyl acetate polymer (e.g. powder, prior to combining with the PLA polymer) is not water redispersible.

A single polyvinyl acetate polymer may be utilized or a combinations of two or more polyvinyl acetate polymers.

The total amount of polyvinyl acetate polymer present in the composition described herein is at least about 10 wt.-% and typically no greater than about 50, 45, or 40 wt.-%, based on the total weight of the PLA polymer, polyvinyl acetate polymer, and plasticizer. In some embodiments, the concentration of polyvinyl acetate polymer is present in an amount of at least 15 or 20 wt.-%.

In some embodiments, the composition has a Tg of less than 30, 29, 28, 27, 26, 25, 24, 23, 22, 21, or 20° C. and does not exhibit plasticizer migration when aged at 80° C. for 24 hours (according to the test methods described in the examples). This property is attributable to the inclusion of the polyvinyl acetate polymer.

The composition further comprises a plasticizer. The total amount of plasticizer in the composition typically ranges from about 5 wt-% to about 35, 40, 45 or 50 wt.-%, based on total weight of PLA polymer, polyvinyl acetate polymer, and plasticizer.

Various plasticizers that are capable of plasticizing PLA have been described in the art. The plasticizers are generally a liquid at 25° C. and typically have a molecular weight ranging from about 200 g/mol to 10,000 g/mol. In some embodiments, the molecular weight of the plasticizer is no greater than 5,000 g/mol. In other embodiments, the molecular weight of the plasticizer is no greater than 4,000, 3,000, 2,000 or 1,000 g/mol. Various combinations of plasticizers may be utilized.

The plasticizer preferably comprises one or more alkyl or aliphatic esters or ether groups. Multi-functional esters and/or ethers are typically preferred. These include alkyl phosphate esters, dialkylether diesters, tricarboxylic esters, epoxidized oils and esters, polyesters, polyglycol diesters, alkyl alkylether diesters, aliphatic diesters, alkylether monoesters, citrate esters, dicarboxylic esters, vegetable oils and their derivatives, and esters of glycerine. Such plasticizers generally lack aromatic groups and halogen atoms and are anticipated to be biodegradable. Such plasticizers commonly further comprise linear or branched alkyl terminal group groups having a carbon chain length of $C_2$ to $C_{10}$.

In one embodiment, the plasticizer is a bio-based citrate-based plasticizer represented by the following Formula (I):

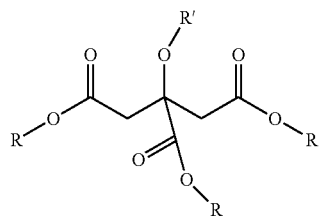

(I)

wherein

R are independently alkyl groups that may be the same or different; and

R' is an H or an ($C_1$ to $C_{10}$) acyl group.

R are typically independently linear or branched alkyl groups having a carbon chain length of $C_1$ to $C_{10}$. In some embodiments, R is a $C_2$ to $C_8$ or $C_2$ to $C_4$ linear alkyl group. In some embodiments, R' is acetyl. In other embodiments, at least one R is a branched alkyl groups having a carbon chain length of $C_5$ or greater. In some embodiments, the branched alkyl group has a carbon chain length no greater than 8.

Representative citrate-based plasticizer include for example triethyl citrate, acetyl triethyl citrate, tributyl citrate, acetyl tributyl citrate, trihexyl citrate, acetyl trihexyl citrate, trioctyl citrate, acetyl trioctyl citrate, butyryl trihexyl citrate, acetyl tris-3-methylbutyl citrate, acetyl tris-2-methylbutyl citrate, acetyl tris-2-ethylhexyl citrate, and acetyl tris-2-octyl citrate, In another embodiment, the plasticizer comprises a polyethylene glycol backbone and ester alkyl terminal groups. The molecular weight of the polyethylene glycol segment is typically at least 100, 150 or 200 g/mole and no greater than 1,000 g/mole. In some embodiments, the polyethylene glycol segment has a molecular weight no greater than 900, 800, 700, or 600 g/mole. Examples include polyethylene glycol (400) di-ethylhexonate availalble from Hallstar, Chicago, Ill. under the trade designation "TegMeR™ 809" and tetraethylene glycol di-ethylhexonate available from Hallstar, Chicago, Ill. under the trade designation "TegMeR™ 804".

In some embodiments, the plasticizer compound typically has little or no hydroxyl groups. In some embodiments, the wt.-% percent of hydroxyl groups relative to the total weight of the plasticizer compound is no greater than 10, 9, 6, 7, 6, 5, 4, 3, 2, 1 wt.-%. In some embodiments the plasticizer compound contains no hydroxyl groups. Thus, in this embodiment, the plasticizer is not glycerol or water.

To facilitate the rate of crystallization, a nucleating agent may also be present in the PLA composition. Suitable nucleating agent(s) include for example inorganic minerals, organic compounds, salts of organic acids and imides, finely divided crystalline polymers with a melting point above the processing temperature of PLA, and combinations of two or more of the foregoing. Suitable nucleating agents typically have an average particle size of at least 25 nanometers, or at least 0.1 micron. Combinations of two or more different nucleating agents may also be used.

Examples of useful nucleating agents include, for example, talc (hydrated magnesium silicate—$H_2Mg_3(SiO_3)_4$ or $Mg_3Si_4O_{10}(OH)_2$), silica ($SiO_2$), titania ($TiO_2$), alumina ($Al_2O_3$), zinc oxide, sodium salt of saccharin, calcium silicate, sodium benzoate, calcium titanate, aromatic sulfonate derivative, boron nitride, copper phthalocyanine, phthalocyanine, sodium salt of saccharin, isotactic polypropylene, polybutylene terephthalate, and the like.

When an organic nucleating agent is present, the nucleating agent is typically at a concentration of at least 0.01, 0.02, 0.03, 0.04, 0.05, 0.1, 0.15 or 0.2 wt.-% ranging up to about 1, 2, 3, 4 or 5 wt.-% based on the total weight of the composition. When the nucleating agent is an inorganic oxide filler such as silica, alumina, zinc oxide, and talc, the concentration can be higher.

In one embodiment, the nucleating agent may be characterized as a salt of a phosphorous-containing aromatic organic acid such as zinc phenylphosphonate, magnesium phenylphosphonate, disodium 4-tert-butylphenyl phosponate, and sodium diphenylphosphinates.

One favored nucleating agent is zinc phenylphosphonate having the following chemical formula:

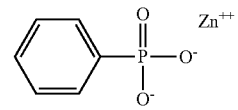

available from Nissan Chemical Industries, Ltd under the trade designation "Ecopromote".

In some embodiments, inorganic fillers may be used to prevent blocking or sticking of layers or rolls of the film during storage and transport. Inorganic fillers include clays and minerals, either surface modified or not. Examples include talc, diatomaceous earth, silica, mica, kaolin, titanium dioxide, perlite, and wollastonite.

Organic biomaterial fillers include a variety of forest and agricultural products, either with or without modification. Examples include cellulose, wheat, starch, modified starch, chitin, chitosan, keratin, cellulosic materials derived from agricultural products, gluten, flour, and guar gum. The term "flour" concerns generally a composition having protein-containing and starch-containing fractions originating from one and the same vegetable source, wherein the protein-containing fraction and the starch-containing fraction have not been separated from one another. Typical proteins present in the flours are globulins, albumins, glutenins, secalins, prolamins, glutelins. In typical embodiments, the composition comprises little or no organic biomaterial fillers such a flour. Thus, the concentration of organic biomaterial filler (e.g. flour) is typically less than 10, 9, 8, 7, 6, 5, 4, 3, 2, or 1 wt.-% of the total composition.

The composition and film may optionally contain one or more conventional additives. Additives include, for example, antioxidants, stabilizers, ultraviolet absorbers, lubricants, processing aids, antistatic agents, colorants, impact resistance aids, fillers, matting agents, flame retardants (e.g. zinc borate), pigments, and the like.

When the film is a monolithic film, the thickness of the film is typically at least 10, 15, 20, or 25 microns (1 mil) to 500 microns (20 mils) thickness. In some embodiments, the thickness of the film is no greater than 400, 300, 200, 150 or 50 microns. The film may be in the form of individual sheets, particularly for a thickness of greater than 20 mils. The (e.g. thinner) film may be in the form of a roll-good.

When the film is a film layer of a multilayer film, the multilayer film typically has the thickness just described. However, the thickness of the film layer may be less than 10 microns. In one embodiment, the film layer comprising the composition described herein is an exterior layer or in other words a skin layer. A second film layer is disposed upon the skin layer. The second film layer typically has a different composition than the skin layer.

In preparing a composition as described herein, the PLA, PVAc, plasticizer, nucleating agent, etc. are heated (e.g. 180-250° C.) and thoroughly mixed using any suitable means known by those of ordinary skill in the art. For example, the composition may be mixed by use of a (e.g., Brabender) mixer, extruder, kneader or the like.

Following mixing, the composition may be formed into a (e.g. cast) film using known film-forming techniques, taking in to consideration the scale of the process and available equipment. In some embodiments, the PLA composition is transferred to a press and then compressed and solidified to form individual sheets of PLA film. In other embodiments, the PLA composition may be extruded through a die onto a casting roll maintained at a suitable cooling temperature to form a continuous length of PLA film. In some embodiments, during the film extrusion, the casting roll temperature is maintained preferably at 80 to 120° C. to obtain crystallization of PLA films on the casting roll.

The PLA compositions and films described herein can be used in a variety of products. In some embodiments, the PLA film has similar or even better properties to polyvinyl chloride (PVC) film, and thus can be used in place of PVC films.

The film and compositions can have various properties, as determined by the test methods set forth in the examples.

The film and composition generally has a glass transition temperature ranging from about −20° C., −15° C., or −10° C. to 40° C.; below the Tg of both the PLA polymer and the polyvinyl acetate polymer. In some embodiments, the film and composition has a glass transition temperature of at least −5, −4, −3, −2, −1 or 0° C. In some embodiments, the film and composition has a glass transition temperature of less than 35° C. or 30° C. or 25° C. In some embodiments, the film and composition has a glass transition temperature of less than 20° C., 19° C., or 18° C.

The film and composition typically has a melting temperature, $T_{m1}$ or $T_{m2}$, ranging from of at least about 150° C. or 155° C. to about 165° C. or 170° C. Further, the composition can have a crystallization peak temperature Tc ranging from 100° C. to 120° C. The net melting endotherm is the energy of the melting endotherm less the energy of the crystallization exotherm (as described in further detail in the forthcoming examples). The net melting endotherm of the compositions (i.e. taken from the microcompounder that are not melt pressed into a film) is determined by the second heating scan; whereas the net melting endotherm of the (e.g. melt pressed) film is determined by the first heating scan. According to U.S. Pat. No. 6,005,068, a PLA film is considered to be amorphous if it exhibits a net melting endotherm of less than about 10 J/g. In favored embodiments, such as when the composition and film comprises a nucleating agent, the net melt enthalpy of the composition and film, $\Delta H_{nm2}$ and $\Delta H_{nm1}$, respectively, is greater than 10, 11, 12, 13, 14 or 15 J/g and less than 40, 39, 38, 37, 36 or 35 J/g.

Figure 3:
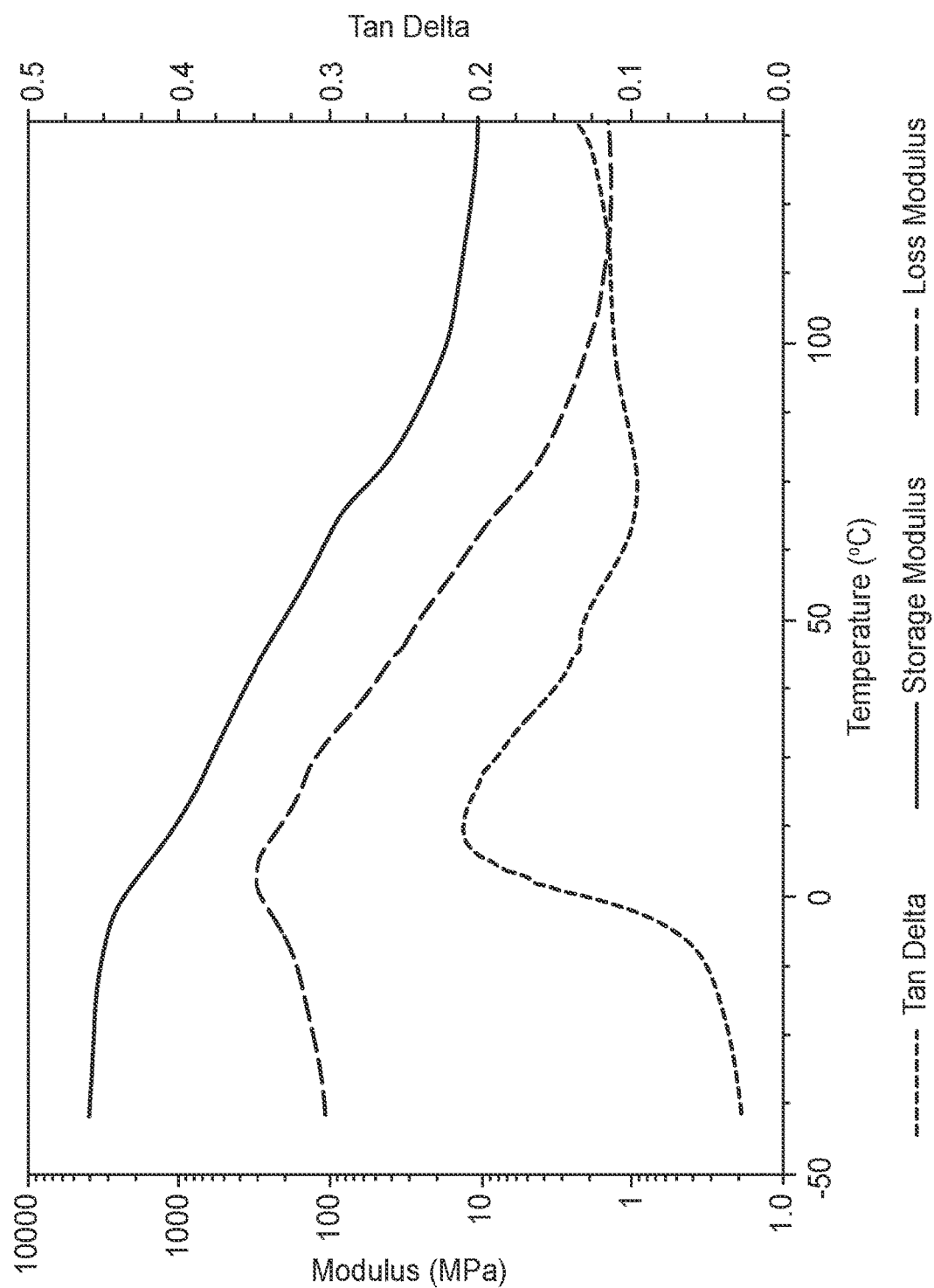
FIG. 3 depicts Dynamic Mechanical Analysis results of Example 12.
Figure 4:
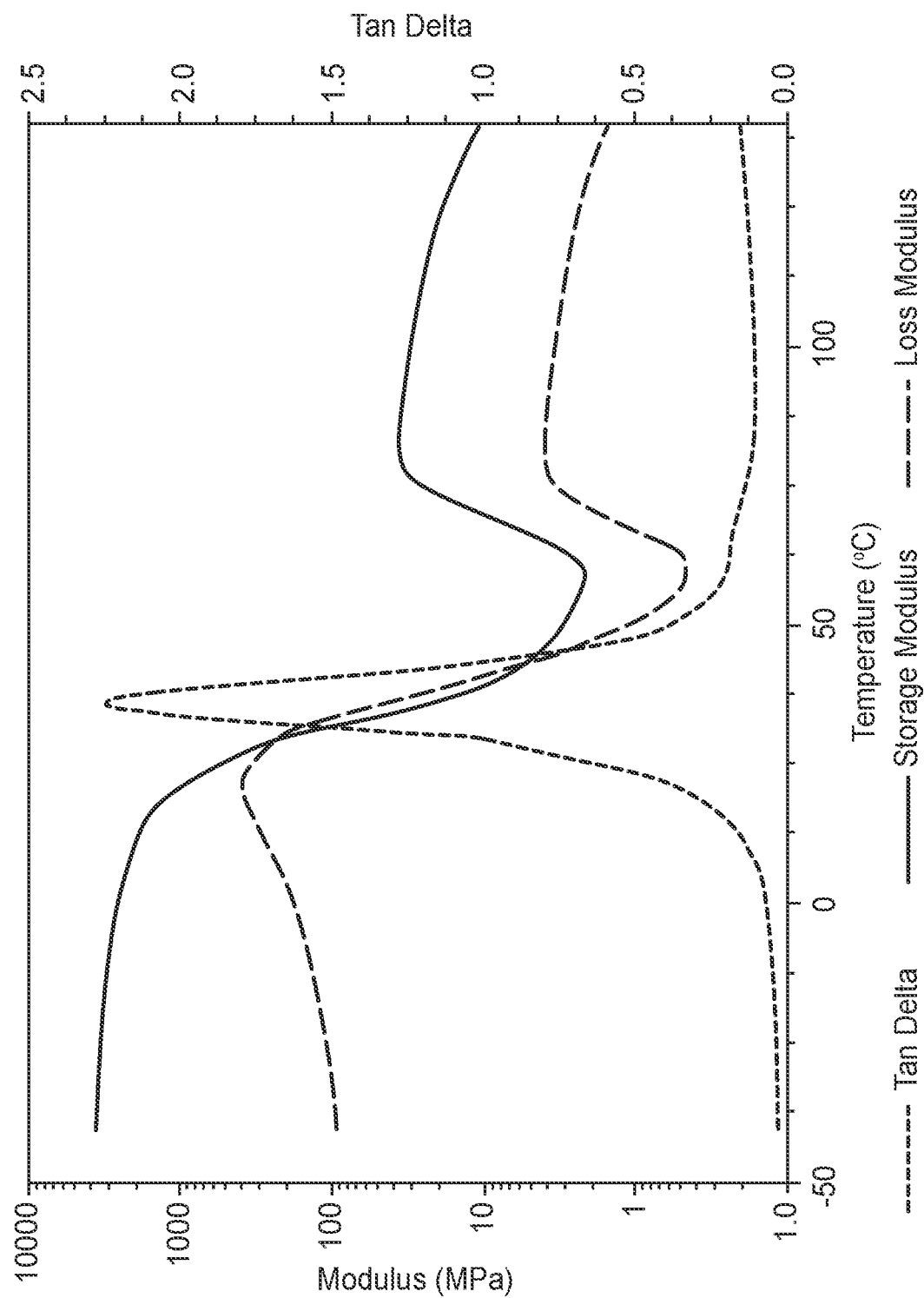
FIG. 4 depicts Dynamic Mechanical Analysis results of Example 16.

In one embodiment the film has a Tg from −10 to 30° C. and a net melting endotherm, $\Delta H_{nm1}$, greater than 10 J/g and less than 40 J/g, as just described. Such films are flexible at room temperature and possess relatively high mechanical properties, such as modulus, upon heating to elevated temperatures as shown by the dynamical mechanical analysis (DMA) results in FIG. 3. In this embodiment, the film has a tensile storage modulus of at least 10 MPa and typically less than 10,000 MPa for a temperature range of −40° C. to 125° C. when heated at a rate of 2° C./min (i.e. the tensile storage modulus does not drop below 10 MPa when heated from −40 to 125° C. when heated at a rate of 2° C./min). In some embodiments, the film has a tensile storage modulus as determine by dynamic mechanical analysis of at least 5, 6, 7, 8, 9, or 10 MPa for a temperature range of 25° C. to 80° C. when heated at a rate of 2° C./min. In contrast, as shown in FIG. 4, when the film has very low net melting endotherm, a dramatic decrease of mechanical properties, such as modulus, occurred as the temperature was increased above room temperature, 23° C.

The film can be evaluated utilizing standard tensile testing as further described in the forthcoming examples. The tensile strength of the film is typically at least 5 or 10 MPa and typically less than the tensile strength of the PLA and polyvinyl acetate polymer utilized to make the film. In some embodiments, the tensile strength is no greater than 34, 33, 32, 31, or 30 MPa. The elongation of the film is typically greater than that of PLA and polyvinyl acetate polymer utilized to make the film. In some embodiments, the elongation is at least 30, 40 or 50%. In other embodiments, the elongation is at least 100%, 150% 200%, 250% or 300%. In some embodiments, the elongation is no greater than 600% or 500%. The tensile modulus of the film is typically at least 50, 100, or 150 MPa. In some embodiments, the tensile modulus is at least 200, 250 or 300MPa. In some embodiments, the tensile modulus is no greater than 750 MPa or 650 MPa.

The PLA-based film described herein is suitable for use as a backing of a pressure sensitive adhesive tape or sheet.

The PLA-based film may be subjected to customary surface treatments for better adhesion with the adjacent pressure sensitive adhesive layer. Surface treatments include for example exposure to ozone, exposure to flame, exposure to a high-voltage electric shock, treatment with ionizing radiation, and other chemical or physical oxidation treatments.

Various pressure sensitive adhesive can be applied to the PLA-based film such as natural or synthetic rubber-based pressure sensitive adhesives, acrylic pressure sensitive adhesives, vinyl alkyl ether pressure sensitive adhesives, silicone pressure sensitive adhesives, polyester pressure sensitive adhesives, polyamide pressure sensitive adhesives, urethane pressure sensitive adhesives, and styrenic block copolymer based pressure sensitive adhesives. Pressure sensitive adhesives generally have a storage modulus (E') as can be measured by Dynamic Mechanical Analysis at room temperature (25° C.) of less than $3\times10^6$ dynes/cm at a frequency of 1 Hz.

The pressure sensitive adhesives may be organic solvent-based, a water-based emulsion, hot melt, heat activatable, as well as an actinic radiation (e.g. e-beam, ultraviolet) curable pressure sensitive adhesive.

The acrylic pressure sensitive adhesives may be produced by free-radical polymerization technique such as solution polymerization, bulk polymerization, or emulsion polymerization. The acrylic polymer may be of any type such as a random copolymer, a block copolymer, or a graft polymer. The polymerization may employ any of polymerization initiators and chain-transfer agents generally used.

The acrylic pressure sensitive adhesive comprises polymerized units of one or more (meth)acrylate ester monomers derived from a (e.g. non-tertiary) alcohol containing 1 to 14 carbon atoms and preferably an average of 4 to 12 carbon atoms. Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctyl-alcohol, 2-ethyl-1-hexanol, 1-decanol, 2-propylheptanol, 1-dodecanol, 1-tridecanol, 1-tetradecanol, and the like.

The acrylic pressure sensitive adhesive comprises polymerized units of one or more low Tg (meth)acrylate monomers, i.e. a (meth)acrylate monomer when reacted to form a homopolymer has a $T_g$ no greater than 0° C. In some embodiments, the low Tg monomer has a $T_g$ no greater than −5° C., or no greater than−10° C. The Tg of these homopolymers is often greater than or equal to −−80° C., greater than or equal to −70° C., greater than or equal to −60° C., or greater than or equal to −50° C.

The low Tg monomer may have the formula $$H_2C=CR^1C(O)OR^8$$

wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In typical embodiments, the acrylic pressure sensitive adhesive comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, isodecyl (meth)acrylate, lauryl (meth)acrylate, as well as esters of (meth)acrylic acid with an alcohol derived from a renewable source, such as 2-octyl (meth)acrylate.

The acrylic pressure sensitive adhesive typically comprises at least 50, 55, 60, 65, 70, 75, 80, 85, 90 wt-% or greater of polymerized units of monofunctional alkyl (meth)acrylate monomer having a Tg of less than 0° C., based on the total weight of the polymerized units (i.e. excluding inorganic filler or other additives).

The acrylic pressure sensitive adhesive may further comprise at least one high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C. High Tg monofunctional alkyl (meth)acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, N-octyl acrylamide, and propyl methacrylate or combinations.

The acrylic pressure sensitive adhesive may further comprise polymerized units of polar monomers. Representative polar monomers include for example acid-functional monomers (e.g. acrylic acid), hydroxyl functional (meth)acrylate) monomers, nitrogen-containing monomers (e.g. acrylamides), and combinations thereof. In some embodiments, the acrylic pressure sensitive adhesive comprises at least 0.5, 1, 2 or 3 wt-% and typically no greater than 10 wt-% of polymerized units of polar monomers, such as acrylamide.

The pressure sensitive adhesive may further include one or more suitable additives according to necessity. The additives are exemplified by crosslinking agents (e.g. multifunctional (meth)acrylate crosslinkers, epoxy crosslinking agents, isocyanate crosslinking agents, melamine crosslinking agents, aziridine crosslinking agents, etc.), tackifiers (e.g., phenol modified terpenes and rosin esters such as glycerol esters of rosin and pentaerythritol esters of rosin, as well as C5 and C9 hydrocarbon tackifiers), thickeners, plasticizers, fillers, antioxidants, ultraviolet absorbers, antistatic agents, surfactants, leveling agents, colorants, flame retardants, and silane coupling agents.

The pressure sensitive adhesive layer may be disposed upon the film by various customary coating methods roller coating, flow coating, dip coating, spin coating, spray coating knife coating, die coating, and printing. The adhesive may be applied directly to the PLA film described herein or transfer coated by use of release liner.

The following Examples are set forth to describe additional features and embodiments of the invention. All parts are by weight unless otherwise indicated.

Materials

PLA, Ingeo 4032D ("4032") and Ingeo 4060D ("4060"), were purchased from Natureworks, LLC. The polyvinyl acetate "PVAc" was obtained from Wacker as the trade designation "Vinnapas™ UW 4 FS". Ecopromote nucleation agent was obtained from Nissan Chemical Industrials (Japan).

Commercially available plasticizers utilized include Citroflex A4 (Vertellus Performance Materials), PEG 400 di-ethylhexonate and tetraethylene glycol di-ethylhexonate ester plasticizers available from Hallstar under the respective trade designation "TegMer 809" and "TegMer 804", polyester plasticizer (3200 molecular weight polymeric adipate) available from Eastman under the trade designation "Admex 6995".

Sample Preparation—Melt Compounding

Samples were prepared by mixing PLA, PVAc, plasticizer and nucleation agent in a DSM Xplore™ 15 cm$^3$ twin-screw micro-compounder at 100 RPM, 200° C. for 10 minutes, and then collecting the sample by opening a valve on the mixing chamber. The compounded samples were subjected to aging testing at 80° C., DSC characterization and melt-pressed into films for tensile testing.

Aging Testing

The compounded samples (0.2 grams) were placed in the closed scintillation vials to prevent plasticizer evaporation during aging testing, and aged in the oven at 80° C. for 24 hours. Then, after aging at 80° C., the sample's surface was inspected to see if there was plasticizer migration. Samples having a wet or oily surface were considered to fail; whereas samples having a dry surface were considered to pass.

DSC—Differential Scanning Calorimetry

The glass transition temperature, crystallization temperature, melting temperature, etc. of each sample was measured using a TA Instruments Differential Scanning Calorimeter according to ASTM D3418-12 unless specified otherwise. Each sample (4~8 mg) was heated from −60 to 200° C. at 10° C./min in a first heating scan and held for 2 minutes to erase its thermal history, then cooled to −60° C. at 10° C./min in a first cooling scan, and heated to 200° C. at 10° C./min in a second heating scan. The second heating scan was used to determine Tg of the compositions and films. Various parameters were derived from the DSC as defined as follows:

$T_g$—refers to the midpoint temperature of the second heating scan, described as $T_{mg}$ in ASTM D3418-12.

$T_c$—refers to the crystallization peak temperature of the first cooling scan, described as $T_{pc}$ in ASTM D3418-12.

$T_{m1}$ and $T_{m2}$—refer to the melting peak temperature of the first and second heating scan, respectively, described as $T_{pm}$ in ASTM D3418-12.

The ability of the composition to crystallize was determined by calculating the net melting endotherm, $\Delta H_{nm2}$, associated with the crystalline material formed during the second cooling scan was calculated with the following equation, $$\Delta H_{nm2}=\Delta H_{m2}-\Delta H_{cc2}$$

where $\Delta H_{m2}$ is the melting endotherm mass normalized enthalpy of the second heating scan and $\Delta H_{cc2}$ is the crystallization exotherm mass normalized enthalpy of the second heating scan (as described in section 11 of ASTM D3418-12). For the compositions comprising nucleating agent, $\Delta H_{cc2}$ was not detected and thus $\Delta H_{nm2}=\Delta H_{m2}$.

The net melting endotherm, $\Delta H_{nm1}$, is associated with the crystallinity in the films (e.g. prepared by melt press). The $\Delta H_{nm1}$ was calculated with the following equation, $$\Delta H_{nm1}=\Delta H_{m1}-\Delta H_{cc1}$$

where $\Delta H_{m1}$ is the melting endotherm mass normalized enthalpy of the first heating scan and $\Delta H_{cc1}$ is the crystallization exotherm mass normalized enthalpy of the first heating scan (as described in section 11 of ASTM D3418-12). For the films comprising nucleating agent, $\Delta H_{cc1}$ was not detected and thus $\Delta H_{nm1}=\Delta H_{m1}$.

The absolute values of the enthalpies associated with the exotherms and endotherms (i.e. $\Delta H_{nm1}$, $\Delta H_{m2}$, $\Delta H_{cc1}$, and $\Delta H_{cc2}$ were used in the calculations.

Melt Press

The compounded samples were placed between two Teflon sheets with a 10 mil thick spacer in between. The Teflon sheets were placed between to metal sheets. The metal sheets with the sample disposed between were placed between the platens of a hydraulic press (available from Carver) and the platens were heated to 340° F. Each sample was preheated for 8 minutes without pressure and then pressed under a pressure of 300 pounds per square inch for 5 minutes. Then, the metal plates were removed from the Carver press and allowed for air cooling. The melt-pressed films were subject to DSC characterization and tensile testing.

Tensile Testing

The melt pressed samples were cut into 0.5 inch wide strips. The tensile testing was conducted at room temperature using Instron 4501 Tensile Tester. The initial grip distance was at 1 inch and the tensile speed was at 1 inch/min or 100% strain/min. Test results were reported as the average of 3-5 sample replicates. The tensile strength (nominal), modulus and percent elongation at break were determined, as described by 11.3 and 11.5 of ASTM D882-10.

Dynamic Mechanical Analysis (DMA)

Dynamic Mechanical Analysis (DMA) was conducted utilizing a film tension fixture available from TA Instruments as "DMA Q800" to characterize the physical properties of the films as a function of temperature. The samples were heated from −40° C. temperature to 140° C. at a rate of 2° C./minute, a frequency of 1 radian/second and a tensile strain of 0.1%.

180 Degree Peel Strength Test Method

A 0.5 inch (~1.3 cm) wide by 6 inch (~15 cm) long strip of adhesive was laminated onto a stainless steel panel using a roller. Dwell time was 10 minutes in the CTH (constant temperature and humidity) room conditioned at 23° C./50% RH. Peel strength measurements are made using a 180 degree peel mode at 12 in/min (~30 cm/min.). Data were recorded as an average of 6 measurements.

The wt.-% of each of the components utilized in the compositions of the examples and control examples (indicated by the "C") is given in Table 1. For example Example 8 contains 70 wt.-% of PLA4032, 15 wt.-% of PVAc, 15 wt.-% of Citroflex A4, based on the total weight of polylactic acid polymer, polyvinyl aceate polymer, and plasticizer. Example 8 further contained 0.2 wt.-% of Ecopromote based on the total weight of the composition. The Tg and aging results of the compositions is also reported in Table 1 as follows:

TABLE 1

| Example | Components | wt % of component | $T_g$ (°C.) | Aging at 80° C. for 24 hrs |
|---|---|---|---|---|
| C1 | PLA4032/Admex6995 | 89/11 | 46 | Pass |
| C2 | PLA4032/Admex6995 | 85/14 | 39 | Fail |
| C3 | PLA4032/Admex6995 | 82/18 | 37 | Fail |
| C4 | PLA4032/CitroflexA4/Ecopromote | 90/10/0.2 | 32 | Pass |
| C5 | PLA4032/CitroflexA4/Ecopromote | 86/14/0.2 | 25 | Pass |
| C6 | PLA4032/CitroflexA4/Ecopromote | 85/15/0.2 | 21 | Fail |
| C7 | PLA4032/CitroflexA4/Ecopromote | 83/17/0.2 | 15 | Fail |
| 8 | PLA4032/PVAc/CitroflexA4/Ecopromote | 70/15/15/0.2 | 15 | Pass |
| 9 | PLA4032/PVAc/CitroflexA4/Ecopromote | 67/16/16/1 | 10 | Pass |
| 10 | PLA4032/PVAc/CitroflexA4/Ecopromote | 65/20/15/0.2 | 17 | Pass |
| 11 | PLA4032/PVAc/CitroflexA4/Ecopromote | 60/25/15/0.2 | 11 | Pass |
| 12 | PLA4032/PVAc/CitroflexA4/Ecopromote | 50/35/15/0.1 | 5 | Pass |
| 13 | PLA4032/PVAc/TegMer809/Ecopromote | 60/28/12/0.2 | 13 | Pass |
| 14 | PLA4032/PVAc/TegMer809/Ecopromote | 53/35/12/0.2 | 9 | Pass |

As illustrated by Table 1, Comparative Examples C1, C4 and C5 passed the aging test, yet Comparative Examples C2, C3, C6 and C7 failed the aging test. The Tg of the sample can be lowered to 25° C. (as illustrated by Comparative C5), but not below 25° C. yet still pass the aging test (as illustrated by Comparative Examples C6 and C7). When the composition included PLA, plasticizer and PVAc, the Tg can be reduced below 25° C. and pass the aging test.

The wt.-% of each of the components utilized in the compositions of the examples and control examples (indicated by the "C"), the DSC results are depicted in Table 2 as follows:

TABLE 2

| Ex. | Components (wt.-% of components) | $T_c$ (°C.) | $T_{m2}$ (°C.) | $T_g$ (°C.) | $\Delta H_{nm2}$ (J/g) |
|---|---|---|---|---|---|
| C15 | PLA/Ecopromote (100/0.2) | 125 | 167 | 63 | 42.9 |
| C4 | PLA4032/CitroflexA4/Ecopromote (90/10/0.2) | 122 | 162 | 36 | 41.4 |
| C5 | PLA4032/CitroflexA4/Ecopromote (86/14/0.2) | 120 | 160 | 25 | 40.1 |
| 8 | PLA4032/PVAc/CitroflexA4/Ecopromote (70/15/15/0.2) | 117 | 165 | 14 | 33.5 |
| 9 | PLA4032/PVAc/CitroflexA4/Ecopromote (67/16/16/1) | 119 | 163 | 10 | 32.5 |
| 10 | PLA4032/PVAc/CitroflexA4/Ecopromote (65/20/15/0.2) | 117 | 165 | 17 | 31.3 |
| 11 | PLA4032/PVAc/CitroflexA4/Ecopromote (60/25/15/0.2) | 115 | 164 | 13 | 29.4 |
| 12 | PLA4032/PVAc/CitroflexA4/Ecopromote (50/35/15/0.1) | 112 | 160 | 5 | 23.8 |
| 13 | PLA4032/PVAc/TegMer809/Ecopromote (60/28/12/0.2) | 120 | 165 | 13 | 28.4 |
| 14 | PLA4032/PVAc/TegMer809/Ecopromote (53/35/12/0.2) | 118 | 164 | 9 | 26.2 |
| 16 | PLA4032/PVAc/CitroflexA4 (50/35/15) as melt pressed | — | 160 | 27 | 1.5 |
| 17 | PLA4032/PVAc/CitroflexA4/Ecopromote (44.8/35/20/0.2) | 112 | 160 | 2 | 23.0 |
| 18 | PLA4032/PVAc/CitroflexA4/Ecopromote (39.8/35/25/0.2) | 109 | 158 | −8 | 20.9 |
| 19 | PLA4032/PLA4060/PVAc/CitroflexA4/Ecopromote (20/34/35/10/1) | 107 | 161 | 27 | 13.2 |
| 20 | PLA4032/PLA4060/PVAc/CitroflexA4/Ecopromote (15/50/20/14/1) | 104 | 161 | 28 | 10.5 |
| 21 | PLA4032/PLA4060/PVAc/TegMer804/Ecopromote (20/34/35/10/1) | 112 | 162 | 22 | 14.5 |

Figure 2:
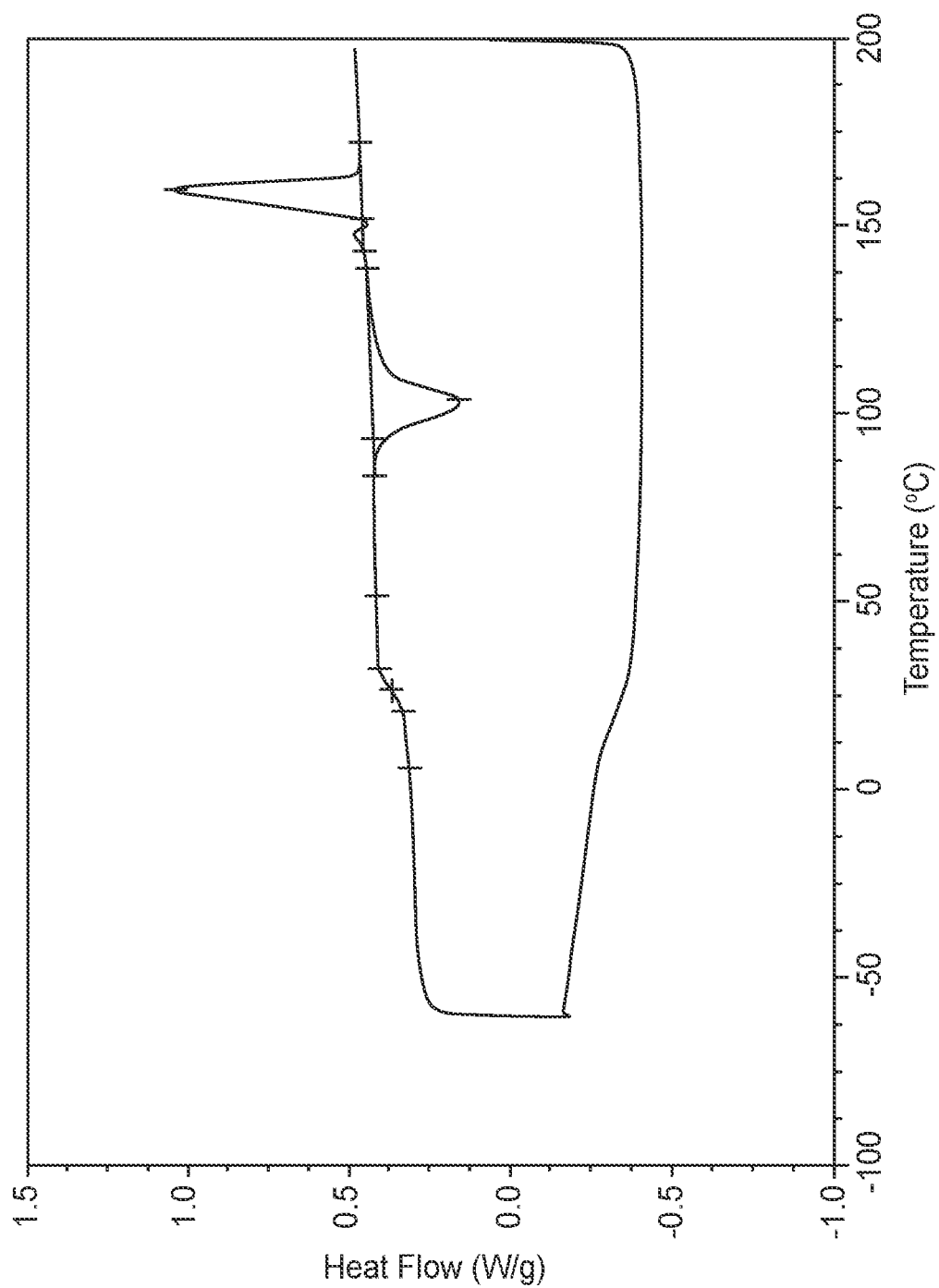
FIG. 2 is a representative DSC profile of a composition without a nucleating agent that did not exhibit a crystallization peak exotherm during cooling.

A representative DSC profile of the composition of Example 12 is depicted in FIG. 1. This DSC profile exhibits a sharp crystallization peak exotherm during cooling. The composition of Example 16 didn't exhibit any crystallization during cooling, as depicted in FIG. 2.

The wt.-% of each of the components utilized in the compositions to prepare the melt-pressed film examples and control examples (indicated by the "C"), the DSC and tensile testing results of these films are depicted in Table 3 as follows:

TABLE 3

| Ex. | Components (wt.-% of components) | $T_{m1}$ (°C.) | $\Delta H_{nm1}$ (J/g) | Tensile Strength (MPa) | Tensile Elongation | Tensile Modulus (MPa) |
|---|---|---|---|---|---|---|
| | Plasticized PVC (RG 180-10) Tg = 15° C. | 160 | N/A | 24 | 200% | 500 |
| | LPDE (DOW 525E) Tg = −60° C. | 120 | N/A | 17 | 490% | 270 |
| | PVAc Tg = 43° C. | — | N/A | 34 | 7% | 3000 |
| | PLA4032 Tg = 63° C. | 167 | N/A | 60 | 6% | 3500 |
| C4 | PLA4032/CitroflexA4/Ecopromote (90/10/0.2) | 168 | 49.6 | 30.3 | 23% | 890 |

TABLE 3-continued

| Ex. | Components (wt.-% of components) | $T_{m1}$ (° C.) | $\Delta H_{nm1}$ (J/g) | Tensile Strength (MPa) | Tensile Elongation | Tensile Modulus (MPa) |
|---|---|---|---|---|---|---|
| C5 | PLA4032/CitroflexA4/Ecopromote (86/14/0.2) | 165 | 36.5 | 24.9 | 28% | 650 |
| 8 | PLA4032/PVAc/CitroflexA4/Ecopromote (70/15/15/0.2) | 164 | 34.2 | 21.6 | 86% | 390 |
| 10 | PLA4032/PVAc/CitroflexA4/Ecopromote (65/20/15/0.2) | 162 | 29.7 | 27.3 | 349% | 371 |
| 11 | PLA4032/PVAc/CitroflexA4/Ecopromote (60/25/15/0.2) | 162 | 30.1 | 20.6 | 363% | 263 |
| 12 | PLA4032/PVAc/CitroflexA4/Ecopromote (50/35/15/0.1) | 162 | 27.0 | 17.9 | 369% | 203 |
| 13 | PLA4032/PVAc/TegMer809/Ecopromote (60/28/12/0.2) | 164 | 31.4 | 21.9 | 320% | 328 |
| 14 | PLA4032/PVAc/TegMer809/Ecopromote (53/35/12/0.2) | 163 | 27.5 | 18.9 | 373% | 253 |
| 16 | PLA4032/PVAc/CitroflexA4 (50/35/15) as melt pressed | 160 | 1.7 | 30.1 | 472% | 241 |
| 17 | PLA4032/PVAc/CitroflexA4/Ecopromote (44.8/35/20/0.2) | 158 | 23.4 | 14.5 | 450% | 153 |
| 18 | PLA4032/PVAc/CitroflexA4/Ecopromote (39.8/35/25/0.2) | 157 | 21.6 | 8.7 | 390% | 101 |
| 19 | PLA4032/PLA4060/PVAc/CitroflexA4/Ecopromote (20/34/35/10/1) | 161 | 14.1 | 26.3 | 302% | 613 |
| 20 | PLA4032/PLA4060/PVAc/CitroflexA4/Ecopromote (15/50/20/14/1) | 159 | 12.1 | 27.9 | 364% | 485 |
| 21 | PLA4032/PLA4060/PVAc/TegMer804/Ecopromote (20/34/35/10/1) | 161 | 14.2 | 25.4 | 380% | 416 |

The Tgs of the films of Table 3 were also measured by DSC and would to be the same as the compositions of Table 2. Examples 12 and 16 were tested according to the previously described Dynamic Mechanical Analysis. The results of Example 12 are depicted in FIG. 3 and the results of Example 16 are depicted in FIG. 4.

Example 22 (EX-22)

A piece of Example 17 film, containing 44.8 wt.-% of PLA4032, 35 wt.-% of PVAc, 20 wt.-% of Citroflex A4, and 0.2 wt.-% of Ecopromote, was overlaminted at room temperature with a 1 mil thick polyacrylate pressure sensitive adhesive, which was derived from 97 wt.-% of isooctyl acrylate and 3 wt.-% of acrylamide and had a weight-average molecular weight of about 1,000,000 g/mol. Subsequently, 180 degree peel strength was measured to be 25 oz/in. During the peel testing, the polyacrylate adhesive adhered well with the PLA-based backing and clean removal of the adhesive from stainless steel panel was observed.

What is claimed:
1. A film comprising:
   semicrystalline polylactic acid polymer and optionally amorphous polylactic acid polymer, wherein the total amount of polylactic acid polymer(s) ranges from 40 wt. % to 75 wt. % based on the total amount of polylactic acid polymer(s), polyvinyl acetate polymer, and plasticizer;
   polyvinyl acetate polymer having a Tg of at least 25° C., wherein the total amount of polyvinyl acetate polymer ranges from 10 wt. % to 40 wt. % based on the total amount of polylactic acid polymer(s), polyvinyl acetate polymer, and plasticizer;
   plasticizer, wherein the total amount of plasticizer ranges from 5 wt. % to 30 wt. % based on the total amount of polylactic acid polymer(s), polyvinyl acetate polymer and plasticizer;
   wherein the film has a tensile elongation from 50% to 600% and does not exhibit plasticizer migration when aged at 80° C. for 24 hours.
2. The film of claim 1 wherein the polyvinyl acetate polymer has a weight or number average molecular weight ranging from 75,000 g/mol to 500,000 g/mol.
3. The film of claim 1 wherein the polyvinyl acetate polymer has a viscosity ranging from 10 to 50 mPa*s when the polyvinyl acetate polymer is dissolved in a 10% ethyl acetate solution at 20° C.
4. The film of claim 1 wherein the semicrystalline polylactic acid polymer comprises at least 90 wt.-% of L-lactide and less than 10 wt.-% of D-lactide and/or meso-lactide.

5. The film of claim 1 wherein the polylactic acid polymer(s) have a melt flow rate of no greater than 25 g/min at 210° C.

6. The film of claim 1 wherein the polylactic acid polymer(s) have a melt flow rate of less than 10 g/min at 210° C.

7. The film of claim 1 wherein the crystalline polylactic acid polymer has a Tg ranging from about 50 to 65° C.

8. The film of claim 1 wherein the polyvinyl acetate polymer has a glass transition temperature no greater than 50° C.

9. The film of claim 1 wherein the plasticizer contains one or more ester or ether groups.

10. The composition film of claim 9 wherein the plasticizer is of the formula

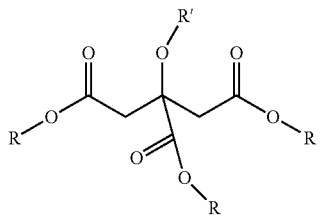

wherein
R may be the same or different and wherein at least one R is a linear or branched alkyl group having a carbon chain length of $C_1$-$C_{10}$ or greater; and
R' is an H or an acyl group.

11. The film of claim 1 further comprising a nucleating agent in an amount ranging from about 0.01 wt % to about 1 wt %.

12. The film of claim 1 wherein the film has a Tg less than 30° C.

13. The film of claim 1 wherein the film has at least one of the following properties:
- a net melting endotherm for the first heating scan, $\Delta H_{nm1}$, greater than 10 and less than 40 J/g;
- a tensile elongation from 150% to 600%;
- a tensile modulus from 50 MPa to 700 MPa;
- a tensile storage modulus as determine by dynamic mechanical analysis of at least 10 MPa for a temperature range from −40° C. to 125° C. when heated at a rate of 2 C°/min; or
- a tensile storage modulus as determine by dynamic mechanical analysis of at least 5 MPa for a temperature range from 25° C. to 80° C. when heated at a rate of 2 C°/min.

14. An article comprising the film of claim 1 and a layer of pressure sensitive adhesive disposed on the film wherein the article is a tape or sheet.

15. The film of claim 1 wherein the film has a tensile strength of at least 10 MPa and no greater than 30 MPa.

16. The film of claim 1 wherein the polyvinyl acetate polymer has a glass transition temperature no greater than 45° C.

17. The film of claim 1 wherein the film comprises amorphous polylactic acid polymer.

* * * * *

UNITED STATES PATENT AND TRADEMARK OFFICE
CERTIFICATE OF CORRECTION

PATENT NO. : 11,787,929 B2
APPLICATION NO. : 17/570862
DATED : October 17, 2023
INVENTOR(S) : Ning Zhou It is certified that error appears in the above-identified patent and that said Letters Patent is hereby corrected as shown below:

In the Claims

Column 17
Line 13, In Claim 10, delete "composition", before "film".

Signed and Sealed this
Twenty-third Day of April, 2024

Katherine Kelly Vidal
*Director of the United States Patent and Trademark Office*